A paper web, especially useful in the manufacture of paper base laminates, is first impregnated with a water soluble phenolic resin. Subsequently, the web is impregnated with an admixture comprising (a) an oil-modified phenolic resin, (b) a water soluble phenolic resin, (c) an epoxy resin, and (d) flame resistant additives. The impregnated paper is dried to evaporate the volatiles and to advance the resins to the desired state. A lay-up of sheets cut from the paper is compressed to form a laminate, and the laminate is ovenized, whereby the resulting laminate is characterized by improved properties.

United States Patent

Nichols, Jr.

[11] 3,804,693
[45] Apr. 16, 1974

[54] PAPER BASE LAMINATES AND METHOD FOR THE MANUFACTURE THEREOF

[75] Inventor: Roy Francis Nichols, Jr., Coshocton, Ohio

[73] Assignee: General Electric Company, Schenectady, N.Y.

[22] Filed: May 17, 1971

[21] Appl. No.: 144,037

[52] U.S. Cl. ............... 156/330, 117/60, 117/76 P, 156/335
[51] Int. Cl. .............................. C09j 3/00
[58] Field of Search ........... 156/330, 335; 117/76 P, 117/60; 161/264, 258, 184; 260/831, 19 EP, 25

[56] References Cited
UNITED STATES PATENTS

| | | | |
|---|---|---|---|
| 3,044,895 | 7/1962 | Isaacson | 117/60 |
| 3,502,533 | 3/1970 | Reiss | 117/76 P X |
| 3,560,328 | 2/1971 | Anderson et al. | 117/76 P X |
| 3,594,268 | 7/1971 | Dahms et al. | 117/76 P X |
| 3,048,508 | 8/1962 | Boiney et al. | 117/76 P X |
| 3,352,744 | 11/1967 | Elmer et al. | 161/264 |
| 3,537,952 | 11/1970 | Dahms | 161/264 X |

Primary Examiner—George F. Lesmes
Assistant Examiner—Paul J. Thibodeau

[57] ABSTRACT

A paper web, especially useful in the manufacture of paper base laminates, is first impregnated with a water soluble phenolic resin. Subsequently, the web is impregnated with an admixture comprising (a) an oil-modified phenolic resin, (b) a water soluble phenolic resin, (c) an epoxy resin, and (d) flame resistant additives. The impregnated paper is dried to evaporate the volatiles and to advance the resins to the desired state. A lay-up of sheets cut from the paper is compressed to form a laminate, and the laminate is ovenized, whereby the resulting laminate is characterized by improved properties.

4 Claims, 1 Drawing Figure

PATENTED APR 16 1974 3,804,693
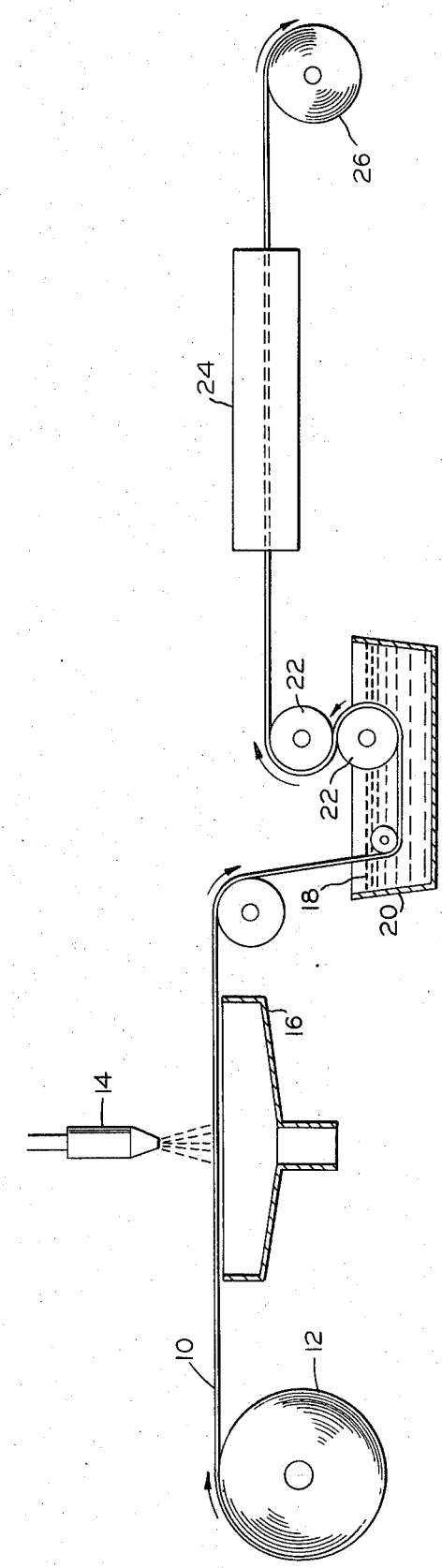
INVENTOR
ROY F. NICHOLS, JR.
BY  R. Jonathan Peters
ATTORNEY

PAPER BASE LAMINATES AND METHOD FOR THE MANUFACTURE THEREOF

This invention relates to a method of treating a paper web. In its more specific aspect, this invention relates to a method of impregnating a cellulosic paper web with a combination of epoxy and phenolic resins for use in paper base laminate products.

In the manufacture of paper base laminates, paper web is impregnated with a combination of epoxy and phenolic resins, and dried at the proper temperature. Sheets are cut from the web to the desired size, and then layed up as a composite, sometimes with another face sheet, between metal plates or press pans. The lay-up is then compressed under pressure and at a temperature and time sufficient to cure the resins and form the laminate. This process is applicable in general to the manufacture of electrical and mechanical grade laminates. Copper foil or other suitable metals may be bonded to one or both faces of the laminate for use in the manufacture of circuit boards, strip transmission lines, and the like.

It is conventional to impregnate the paper web by a two-pass process. In the first pass or step of this process, the paper web is impregnated with an aqueous solution comprising a water soluble thermosetting resin and water or other suitable solvent. The paper is then passed to a drying oven where the solvent is evaporated and the resin is advanced (polymerized) to the desired state. In the art, it has been found that the resin impregnant should be substantially advanced, for otherwise the final laminated product will exhibit relatively poor electrical properties and low solder blister resistance. This treated paper, commonly referred to as the precoat paper, is next impregnated on the second pass with a phenolic or epoxy resin dissolved in a suitable solvent. The resin impregnated paper is dried a second time to advance the resins to a desired state to render the paper web substantially tack free. The paper is then wound on a suitable take-up roll or cut to desired size for use in a lay-up.

A two coat, one pass procedure is described and claimed in copending application Ser. No. 1,592, filed Jan. 9, 1970, and now abandoned, in the name of Edward Chu and assigned to the same assignee as this application. According to this invention the paper web is first impregnated with a water soluble phenolic resin. Immediately thereafter, the wetted web is impregnated with a phenolic resin selected from the group consisting of (a) a water insoluble phenolic resin, and (b) a mixture comprising a water soluble phenolic resin and a water insoluble phenolic resin. In the first impregnating step (referred to as the pre-wet step), the soluble phenolic resin is relatively dilute and preferably includes an alcoholic solvent to reduce the viscosity of the resin. As a consequence, the cellulosic fibers are readily impregnated with the phenolic resin. In the second impregnating step, the resin is incorporated into the web in the proper amount so as to render a laminate with desired properties. The impregnated paper is then dried at a temperature sufficient to evaporate the volatiles and to advance the resins to the desired state. It will be observed that impregnation of the fibers with the resins is accomplished in essentially one pass in that the conventional first drying step is omitted altogether. The drying step after the first impregnation is eliminated, but because the fibers have been wetted, resins from the second impregnating bath blend readily with the resin impregnant from the first bath. The resins, therefore, are substantially integrated throughout the paper, and the final product is characterized by good physical and electrical properties.

Industrial laminates intended primarily for electrical applications must exhibit high insulation resistance and low dielectric losses under severe humidity conditions. Cellulose paper-base laminates with a phenolic or epoxy resin binder have wider application for electrical grades. A flame resistant additive may be incorporated into the laminate to render it flame resistant so as to be self-extinguishing after the source of ignition is removed. However, flame resistant laminates are relatively brittle and must be heated to a temperature of about 120° to 250°F. before such fabricating operations as shearing, blanking, and punching can be performed satisfactorily. As a result, breakage during handling and fabricating occurs especially on production lines such as in the television industry. This limitation of fabricating properties is obviously disadvantageous.

This invention has therefore as its purpose to provide a flame resistant paper base laminate characterized by good fabricating properties at about room temperature as well as good electrical properties.

In its broad aspect, the invention comprises impregnating the paper web with a water soluble phenolic resin. Immediately thereafter, the wetted web is impregnated with a resin mix comprising (a) an oil-modified phenolic resin, (b) a water soluble phenolic resin, (c) an epoxy resin, and (d) flame resistant additives. It should be understood that for this invention the term "oil-modified phenolic resin" is intended to include rosin-modified phenolic resin as well. The impregnated paper is then dried at a temperature sufficient to evaporate the volatiles and to advance the resins to the desired state. It will be observed that the fibers are impregnated with the resins in essentially one pass in that the conventional first drying step is omitted altogether. The paper is impregnated with resins on both occurrences, and not simply on the second step of the operation. The resins are substantially integrated throughout the paper, and the final product is characterized by good physical and electrical properties.

In the pre-wet step of the process, the paper is impregnated with a water soluble phenolic resin. The water soluble resin is applied to the paper web as a dilute aqueous solution, and an organic solvent is preferably incorporated with the solution to further reduce the viscosity and thereby facilite impregnation. The organic solvent should have a boiling point substantially below the cure temperature of the resin so that during the paper drying operation the solvent will be volatized without advancing the resin beyond the desired state. Suitable organic solvents include, for example, methyl alcohol, ethyl alcohol and isopropyl alcohol. The pre-wet solution should contain about 4 to 30 percent by weight resin solids, and the pre-wet pick-up should be from about 10 to 45 percent by weight of the total weight of the wet paper, and preferably from 15 to 30 percent. Generally, a pre-wet pick-up much in excess of 45 percent creates a handling problem because of the possible breakage of the wet paper, and furthermore requires excessive time and heat to evaporate the solvents. On the other hand, a pre-wet pick-up substantially less than 10 percent is not sufficient to effect proper impregnation.

The wetted web from the pre-wet impregnating step is passed directly to the second impregnating bath where the web is impregnated with the resin mix, having incorporated therein flame resistant additives. The flame resistant additives include antimony oxide in combination with one or more brominated or chlorinated organic compounds such as chlorinated biphenyl, chlorinated triphenyl, chlorinated wax, tri-cresyl phosphate, tri-phenyl phosphate, tris (2,3-dibromopropyl) phosphate, and the like. The amount of flame resistant additives may range from about five to 40 percent by weight based on the weight of resin formulation (solids), and preferably 15 to 35 percent. The upper limit may be somewhat higher depending upon the additives used, but this limit is essentially determined by maintaining the integrity of the resin.

It is important to employ a proper balance between the phenolic resin and the epoxy resin so as to obtain an end product having desired useful properties. Laminates made from paper impregnated with oil-modified phenolic resin exhibit flexibility, softness and good fabricating properties relative to the unmodified phenolic resin. However, at room temperature, such a laminate is still somewhat brittle and therefore presents limitations in fabricating and tends to distort and powder. When the epoxy resin is combined with the oil-modified phenolic, the epoxy resin contributes to the resiliency, high flexural strength and low dielectric loss of the laminate (thereby overcoming these fabricating limitations). On the other hand, the water soluble phenolic resin penetrates the paper and therefore contributes to the moisture resistance of the laminate. The resin mix, therefore, desirably comprises about 5 to 20 parts by weight of water soluble phenolic resin solids and 10 to 35 parts by weight of epoxy solids per 100 parts by weight of oil-modified phenolic resin solids. If less than 5 parts of water soluble phenolic resin is used, the electrical properties of the laminate are degraded; but a higher content than 20 results in a laminate that is too brittle. Also, the desired fabricating properties are not achieved if less than 10 parts epoxy resin is used. However, if the epoxy content is too high, all the resin may not cure which therefore degrades the electrical properties and heat resistance of the laminate. As a result of both impregnating steps, the resin content, including additives, of the dry paper stock ranges from about 40 to 70 percent by weight.

The impregnated web is then passed through a suitable dryer for removal of the volatiles. Complete cure of the resins, which is a factor of temperature and time, should be avoided at this stage. Therefore, the temperature and dwell time for drying should be properly controlled so that substantially none of the resins is completely cured during this operation. The dried, resin-impregnated web may then be wound on a take-up roll.

In the manufacture of a paper base laminate, a plurality of sheets is cut to desired size from the resin-impregnated web and layed-up on a stack. The lay-up is then placed between steel plates or press pans, and the composite is then compressed under heat and pressure and for a period of time necessary to complete this cure of the resin and bond the laminate.

It is essential that phenolic paper base laminates exhibit dimensional stability. The laminate is frequently fabricated at elevated temperature, and if the dimensions are altered as a result of temperature changes, the laminate will no longer conform to specification. In order to improve dimensional stability, the laminate is oven treated at a temperature of about 90° to 150°C. for about 1 to 6 hours. Ovenizing, as this heat treatment is called, improves somewhat the dimensional stability of phenolic paper base laminates made according to the prior art. Laminates made according to this invention, however, exhibit a marked improvement in dimensional stability.

Equally significant, the phenolic paper base laminate is flame resistant yet characterized by a relatively high degree of flexibility and resiliency. As a result, the laminate can be handled and fabricated at room temperature thereby obviating the need for heating the laminate prior to such conventional operations as blanking, punching or shearing. Laminate made by this invention, therefore, has a two-fold advantage to the fabricator; viz., breakage is minimized, and heating to fabricate is eliminated.

Phenolic resins commonly used in the manufacture of paper base laminates comprise the condensation reaction product of phenol and an aldehyde, e.g., formaldehyde. For purposes of this invention, the resin is oil and/or rosin modified. In the commercial production of these resins, the phenol may be phenol itself (hydroxybenzene), the cresols, the xylenols, other alkyl phenols, or mixtures thereof. Formaldehyde is commonly employed as the aldehyde component in preparing the resin, but it should be understood that other aldehydes such as paraformaldehyde, acetaldehyde, furfuraldehyde and benzaldehyde are also useful. The phenol is reacted with an aldehyde (e.g., formaldehyde) to form the phenol aldehyde resin, which desirably has a mol ratio of phenol to formaldehyde of 1:1.1 to 1:1.5. When the stroke cure of the resin reaches the proper level, the resulting resin is then typically mixed with a suitable solvent such as toluol or an alcohol to facilitate handling.

Epoxy resins are used extensively in the manufacture of electical grade laminates. A widely used class of resins is prepared from the reaction between bisphenol A, which may be brominated, and epichlorhydrin. These epoxy resins are well known to the prior art, and the particular resin employed will depend largely upon the desired end properties for the laminate. The epoxy resin is diluted with a suitable solvent such as acetone, methylethylketone, or toluol.

Cellulosic paper useful as filler and face sheets for paper base laminates are well known and may include, for example, Kraft, sulfite, alpha-cellulose, cotton linter, and cotton linter and wood pulp combined. Where desired, the paper web may comprise an admixture of cellulosic fibers and synthetic fibers such as fiber glass, nylon, rayon, and the like. The paper is impregnated by any suitable conventional means. This may include, for example, spraying the paper, passing the paper through an impregnating bath, by roller application or by brushing. In the pre-wet step, however, spraying is preferred because it provides a relatively uniform application. For the second application of the resin mix and flame resistant additives, the paper web preferably is passed through a resin bath which desirably includes a set of squeeze rolls for controlling the resin content of the impregnated stock.

There is illustrated schematically in the drawing a technique for impregnating the paper web. The paper web 10 from an unwind reel 12 is drawn past a spray manifold 14 where a water soluble phenolic resin dissolved in water and an alcohol is sprayed onto the web. Any surplus resin is caught in pan 16 disposed below the web, and the resin may be recirculated. The wetted paper is then passed directly through a resin mix bath 18 contained in vessel 20 for impregnating the web. As explained above, resin mix 18 comprises an oil-modified phenolic resin, a water soluble phenolic resin, an epoxy resin, flame resistant additives, and other desired additives. The web is then passed through a set of squeeze rolls 22, and from there through a suitable drying oven 24 operated at a sufficient temperature to evaporate the volatiles and advance the resins to the desired state. From there, the web is rewound on a suitable take-up reel 26.

The invention is illustrated further by the following example:

A pre-wet resin solution was prepared comprising, parts by weight 100 parts water soluble phenol-formaldehyde resin having a mol ratio of phenol to formaldehyde of about 1:1.3, 30 parts isopropyl alcohol, and 120 parts water. The resin employed in the solution comprised about 50% by weight solids, and therefore the final solution was about 20% by weight resin solids. A web of cotton linter and wood pulp paper was impregnated with this pre-wet solution by spraying, and the pre-wet solution pick-up was about 23.2% by weight of the total weight of the wet paper.

The pre-wet paper was impregnated with one of two resin mixes prepared according to the following recipes, showing parts by weight for each ingredient:

|  | A | B |
|---|---|---|
| Epon 828 (epoxy resin, Shell Chemical Corp., with epoxide equivalent of 180–195, 100% solids) | — | 7 |
| Ciba 8011A75 (epoxy resin, Ciba Corp. with epoxide equivalent of 455–500, 75% solids) | 20 | — |
| Oil-modified phenol-formaldehyde resin (mol ratio of phenol to formaldehyde of 1:1.14, 55% solids, tung oil modified) | 100 | 100 |
| Acetone | 8 | 16 |
| Water soluble phenolic resin used in the pre-wet | 12 | 9 |
| Aroclor 1262 (chlorinated biphenyls, Monsanto Chemical Co.) | 12 | 9 |
| Chlorowax 70 (chlorinated paraffin, 70% chlorine, Diamond Shamrock Chemical Co.) | — | 13 |
| Antimony trioxide | 8 | 8 |

Wet webs from the pre-wet step were then passed through these final resin mixes A and B. The impregnated webs were then passed through a drying oven and wound on a take-up roll. The total resin content, including additives, for the impregnated webs were about 59.5 percent by weight. Paper web impregnated with Recipe A was used as face sheets, and paper web impregnated with Recipe B was used as filler sheets.

In evaluating the paper webs, filler and face sheets were cut from the impregnated webs and stacked with 1 ounce or 2 ounce copper foil on one side. The lay-up was pressed at an elevated temperature and pressure to form a laminate having a thickness of one-sixteenth inch. Before conducting certain tests, specimens were cut to desired size from the laminate, and the copper removed with ammonium persulfate solution per the requirements of the test.

Conventional tests for laminates of this type were conducted and the test results are set forth in the following table:

TABLE - LAMINATE TESTS

| | Tests | Results |
|---|---|---|
| 1. | Water Absorption (ASTM D-570-63) | 0.40 |
| 2. | Flexural Strength (ASTM D-790-66) | |
| | Lengthwise | 21,700 psi |
| | Crosswise | 16,980 psi |
| 3. | Dissipation Factor (ASTM D-669-59) | |
| | Condition A | 0.027 |
| | D-24/23 | 0.028 |
| 4. | Dielectric Constant (ASTM D-669-59) | |
| | Condition A | 3.79 |
| | D-24/23 | 3.90 |
| 5. | Volume Resistivity (ASTM D-257) | |
| | Condition C96/35/90 | 1,600,000 megohms |
| 6. | Surface Resistance (ASTM D-257) | |
| | Condition C-96/35/90 | 13,000 megohms |
| 7. | Max. Strain In./In. (ASTM D-790) | |
| | Lengthwise | 0.0275 |
| | Crosswise | 0.0332 |
| 8. | Deflection at Rupture (ASTM D-790) | |
| | Lengthwise | 0.079 |
| | Crosswise | 0.095 |

TABLE - LAMINATE TESTS—Continued

| Tests | Results |
|---|---|
| 9. Flammability (ASTM D-229) | 1 – 4 seconds (Required to pass – 15 seconds) |
| 10. Underwriters Laboratories Flame Test (Bulletin No. 55, Par. 3,205) | Self-extinguishing — extinguishes in less than 5 seconds. |

It will be observed that a laminate made in accordance with this invention is flame resistant and exhibits good physical and electrical properties. Further, the values in the Table for maximum strain and deflection at rupture show a substantial improvement in resiliency as compared to the conventional phenol laminate which is especially significant as a measure of fabricating properties. As a result of this improvement, the laminate need not be heated prior to fabricating operations.

I claim:

1. A method for the manufacture of paper base laminates comprising: (a) impregnating a paper web with about 15– 30 percent by weight of the total weight of the wet paper web with a water soluble phenolic resin; (b) immediately thereafter impregnating the wetted web with a resin mix comprising (i) an oil-modified phenolic resin, (ii) a water soluble phenolic resin (iii) an epoxy resin, and (iv) flame resistant additives, said resin mix comprising about 5 – 20 parts by weight of water soluble phenolic resin solids and 10 – 35 parts by weight of epoxy resin solids per 100 parts by weight of oil-modified phenolic resin solids; (c) drying the resulting impregnated web, the total resin content and additives content of said dry web ranging from about 40 – 70 percent by weight; (d) laying-up a plurality of sheets cut from said impregnated web; and (e) curing the lay-up of sheets under heat and pressure to form a laminate; said resulting laminate characterized by good fabricating properties at room temperature and flame resistance.

2. A method according to claim 1 wherein the flame resistant additives include antimony oxide and an organic compound selected from the group consisting of chlorinated biphenyl, chlorinated triphenyl and chlorinated paraffin.

3. A method according to claim 1 wherein said laminate is further ovenized at a temperature of about 90° to 150° C. for about 1 – 6 hours.

4. A laminate made by the process of claim 1.

* * * * *